(12) United States Patent
Bae et al.

(10) Patent No.: US 11,670,842 B2
(45) Date of Patent: Jun. 6, 2023

(54) VEHICLE AND AN ANTENNA SPOILER FOR A VEHICLE

(71) Applicants: HYUNDAI MOTOR COMPANY, Seoul (KR); KIA CORPORATION, Seoul (KR); ACE TECHNOLOGIES CORPORATION, Incheon (KR)

(72) Inventors: Jungnam Bae, Seoul (KR); Byoung Hyun Lee, Yongin-si (KR); Jihoon Sung, Seoul (KR); Sangpil Kang, Incheon (KR); Seyoung Park, Seoul (KR)

(73) Assignees: HYUNDAI MOTOR COMPANY, Seoul (KR); KIA CORPORATION, Seoul (KR); ACE ANTENNA CORP., Incheon (KR)

( * ) Notice: Subject to any disclaimer, the term of this patent is extended or adjusted under 35 U.S.C. 154(b) by 41 days.

(21) Appl. No.: 17/508,835

(22) Filed: Oct. 22, 2021

(65) Prior Publication Data

US 2022/0131260 A1 Apr. 28, 2022

(30) Foreign Application Priority Data

Oct. 23, 2020 (KR) ........................ 10-2020-0138573

(51) Int. Cl.
| | |
|---|---|
| *H01Q 1/20* | (2006.01) |
| *H01Q 9/30* | (2006.01) |
| *H01Q 1/32* | (2006.01) |
| *H01Q 9/04* | (2006.01) |

(52) U.S. Cl.
CPC ............ *H01Q 1/3275* (2013.01); *H01Q 1/20* (2013.01); *H01Q 9/0407* (2013.01); *H01Q 9/30* (2013.01)

(58) Field of Classification Search
CPC .......... H01Q 1/3275; H01Q 9/30; H01Q 9/44; H01Q 9/40; H01Q 21/28
See application file for complete search history.

(56) References Cited

U.S. PATENT DOCUMENTS

| | | | |
|---|---|---|---|
| 6,927,736 B1 * | 8/2005 | Kornbau | .............. H01Q 1/3275 343/711 |
| 8,952,854 B2 | 2/2015 | Fellows et al. | |
| 9,666,936 B2 | 5/2017 | Hirayama et al. | |

(Continued)

FOREIGN PATENT DOCUMENTS

| | | |
|---|---|---|
| EP | 3139440 A1 | 3/2017 |
| EP | 3176871 A1 | 6/2017 |

(Continued)

*Primary Examiner* — Ab Salam Alkassim, Jr.
*Assistant Examiner* — Anh N Ho
(74) *Attorney, Agent, or Firm* — Lempia Summerfield Katz LLC (57) ABSTRACT

A vehicle may include a spoiler mounted on or near a rear of a vehicle and an antenna apparatus provided inside the spoiler. The spoiler may include a spoiler body configured to include a seating portion on which the antenna apparatus is seated, and a cover configured to cover the seating portion. The antenna apparatus may include a casing, a cable electrically connected to an electric apparatus in the vehicle, a pole type antenna provided outside the casing, and an antenna assembly electrically connected to the cable and the pole type antenna and including at least one semiconductor element and a plurality of patch antennas mounted on a printed circuit board.

10 Claims, 13 Drawing Sheets

(56) References Cited

U.S. PATENT DOCUMENTS

| | | | |
|---|---|---|---|
| 10,186,763 B2 | 1/2019 | Niihara et al. | |
| 2004/0217906 A1* | 11/2004 | Ishibayashi | H01Q 1/1271 |
| | | | 343/711 |
| 2006/0290580 A1* | 12/2006 | Noro | H01Q 1/3275 |
| | | | 343/715 |
| 2008/0001834 A1* | 1/2008 | Yegin | B60R 1/12 |
| | | | 343/713 |
| 2012/0229351 A1* | 9/2012 | Fellows | H01Q 9/46 |
| | | | 343/702 |
| 2015/0029063 A1 | 1/2015 | Andou | |
| 2017/0069960 A1 | 3/2017 | Funatsu et al. | |
| 2017/0301981 A1 | 10/2017 | Niihara et al. | |
| 2021/0387684 A1* | 12/2021 | Smith | B67D 1/0829 |
| 2022/0006179 A1* | 1/2022 | Miller | B62D 35/007 |

FOREIGN PATENT DOCUMENTS

| | | | | |
|---|---|---|---|---|
| EP | 3943370 A1 * | 1/2022 | | |
| GB | 2578597 A * | 5/2020 | | B60R 11/02 |
| JP | H03135882 A | 6/1991 | | |
| KR | 980006614 A | 3/1998 | | |
| KR | 0120501 Y1 | 7/1998 | | |
| KR | 200142740 Y1 | 6/1999 | | |
| KR | 100349847 B1 | 8/2002 | | |
| KR | 102206670 B1 * | 1/2021 | | |

* cited by examiner

VEHICLE AND AN ANTENNA SPOILER FOR A VEHICLE

CROSS-REFERENCE TO RELATED APPLICATION

This application is based on and claims priority under 35 U.S.C. § 119 to Korean Patent Application No. 10-2020-0138573, filed on Oct. 23, 2020 in the Korean Intellectual Property Office, the disclosure of which is incorporated herein by reference.

BACKGROUND

1. Field

The disclosure relates to a vehicle and an antenna for the vehicle, and more particularly, to a vehicle including an antenna embedded in a spoiler and an antenna apparatus mounted on a spoiler for the vehicle.

2. Description of the Related Art

Generally, a vehicle refers to an apparatus of transportation that travels on a road or track using fossil fuel, electricity, or the like as a power source.
Recently, in addition to simply transporting goods and personnel, vehicles generally include audio and video apparatuses so that drivers may listen to music and watch videos while driving, and a navigation apparatus that displays a route to a destination for a driver is also widely installed.

For this reason, the necessity for the vehicle to communicate with an external apparatus is increasing.

For example, in the case of a navigation function guiding the vehicle on a route to the destination, the vehicle may receive a GPS signal from a global positioning system (GPS) satellite in order to determine the location of the vehicle. The vehicle may receive a radio broadcast signal and/or a multimedia broadcast signal to reproduce a broadcast sound and/or image. In addition, the vehicle may communicate with a mobile communication base station and/or another vehicle through a mobile communication service.

An antenna for communication with external apparatuses may be provided in the vehicle. In particular, since the frequency of the GPS signal, the frequency of the broadcast signal and the frequency of the mobile communication signal are different from each other, a plurality of antennas having different shapes are provided in the vehicle.

On the other hand, the conventional antenna is assembled to the roof of the vehicle in the form of a shark fin or a pole and is exposed to outside. As a result, restrictions arise in the design and size of the antenna. For example, the antenna may include an AM/FM radio antenna, a global navigation satellite system (GNSS) antenna, a distributed matching antenna (DMA), and a mobile communication antenna. The four antennas are integrated and thus a restriction of design and size for safety reasons occurs.

SUMMARY

An aspect of the disclosure is to provide a spoiler for a vehicle in which an antenna of the vehicle is embedded and to provide a vehicle including an antenna embedded in the spoiler.

An aspect of the disclosure is to provide a spoiler in which a plurality of antennas operating at different frequencies are embedded and to provide a vehicle including the same.

An aspect of the disclosure is to provide a spoiler in which an antenna apparatus is embedded, and which is capable of mounting a plurality of antennas for mobile communication and to provide a vehicle including the same.

A vehicle according to an aspect of the disclosure may include a spoiler mounted on or near a rear of the vehicle and an antenna apparatus provided inside the spoiler. The spoiler may include a spoiler body configured to include a seating portion, on which the antenna apparatus is seated, and a cover configured to cover the seating portion. The antenna apparatus may include: a casing; a cable electrically connected to an electric apparatus in the vehicle; a pole type antenna provided outside the casing; and an antenna assembly electrically connected to the cable and the pole type antenna. The antenna apparatus may also include at least one semiconductor element and a plurality of patch antennas mounted on a printed circuit board.

The casing may include an upper case; a lower case; and a sealing pad disposed between the upper case and the lower case.

The upper case may be provided with a seating space in which the pole type antenna is seated.

The seating space may be provided with a plurality of supports configured to support the pole type antenna.

The pole type antenna may include a spring coil, a shell surrounding the spring coil, and a metal thread electrically connected to the spring coil and inserted into the upper case.

The upper case may include a pole insert coupled to the metal thread and the pole insert may be electrically connected to the antenna assembly.

The sealing pad may be provided with a coupling groove into which the upper case is inserted.

Each of the lower case and the sealing pad may be provided with a fixing hole into which a bolt for fixing the antenna apparatus to the spoiler body may be inserted.

The plurality of patch antennas may include a first mobile communication antenna installed on one end of the printed circuit board and a second mobile communication antenna installed on another end of the printed circuit board.

The plurality of patch antennas may include a global navigation satellite system (GNSS) antenna and a SiriusXM (SXM) antenna stacked on the GNSS antenna.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure are described and description of elements that are commonly known in the art or elements that overlap each other in the embodiments have been omitted.

The terms as used throughout the specification, such as "~ part", "~ module", "~ member", "~ block", etc., may be implemented in software and/or hardware. A plurality of "~ parts", "~ modules", "~ members", or "~ blocks" may be implemented in a single element, or a single "~ part", "~ module", "~ member", or "~ block" may include a plurality of elements.

It should be further understood that the term "connect" or its derivatives refer both to direct and indirect connection and that the indirect connection includes a connection over a wireless communication network.

It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components and are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

When a component, device, element, or the like of the present disclosure is described as having a purpose or performing an operation, function, or the like, the component, device, or element should be considered herein as being "configured to" meet that purpose or to perform that operation or function.

Hereinafter, the operating principles and embodiments of the present disclosure are described with reference to the accompanying drawings.

Figure 1:
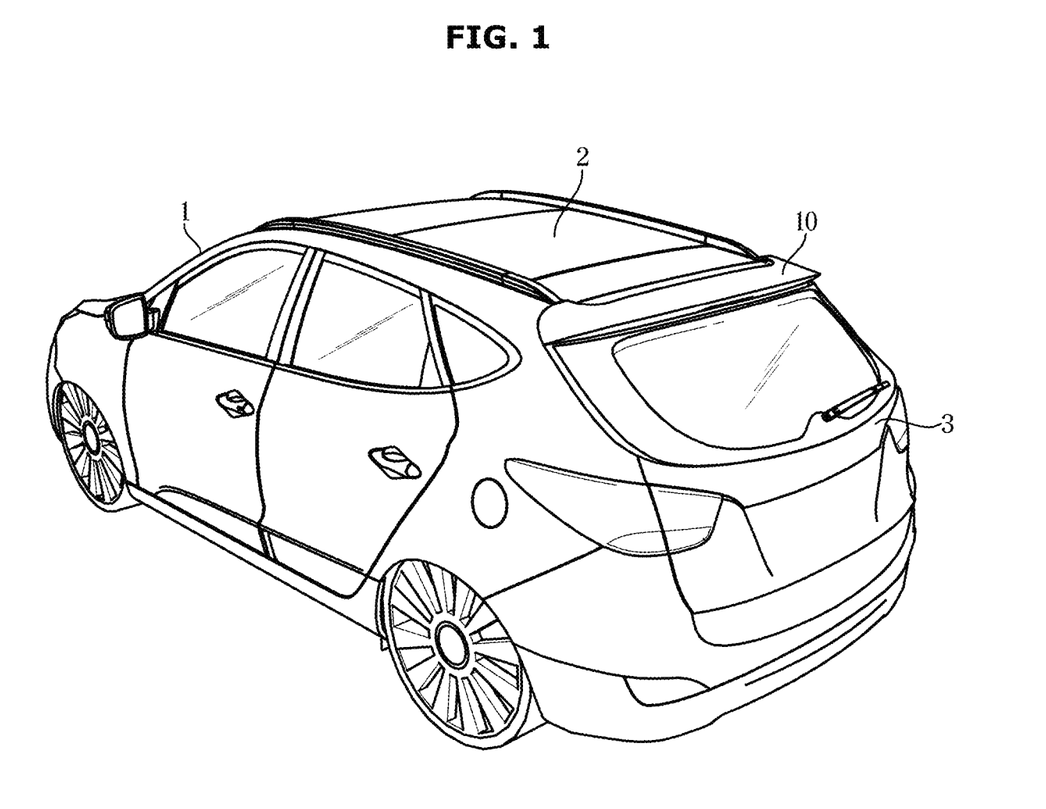
FIG. 1 illustrates a vehicle according to an embodiment.
Figure 2:
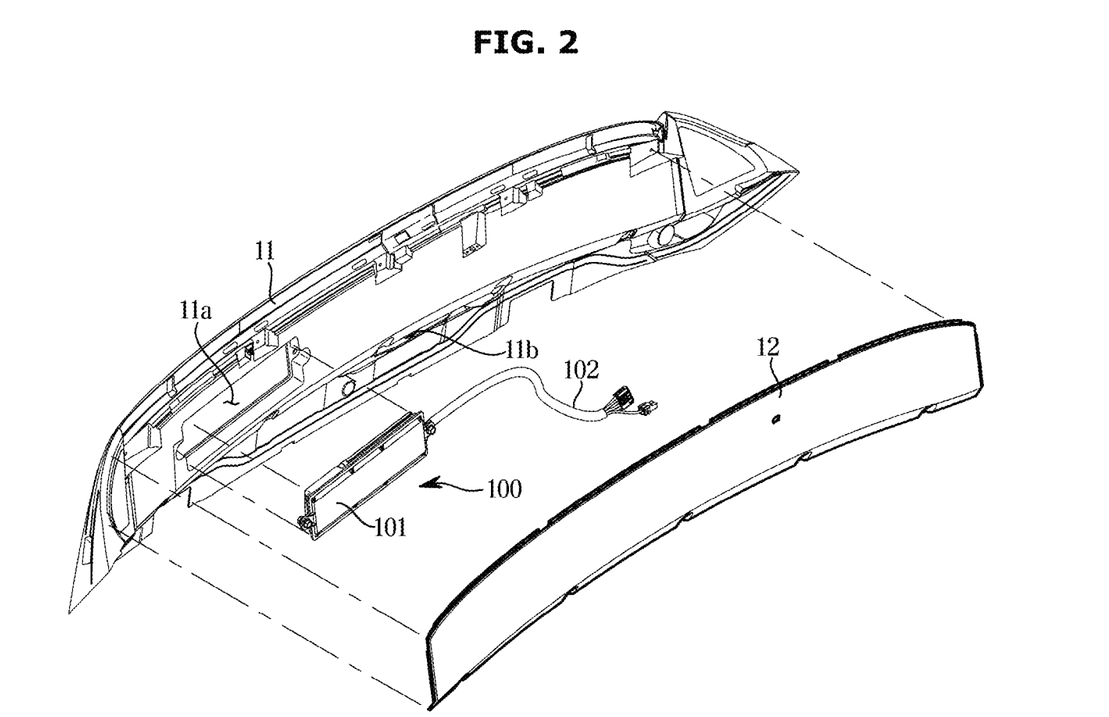
FIG. 2 illustrates an antenna apparatus according to an embodiment that is separated from a spoiler.
Figure 3:
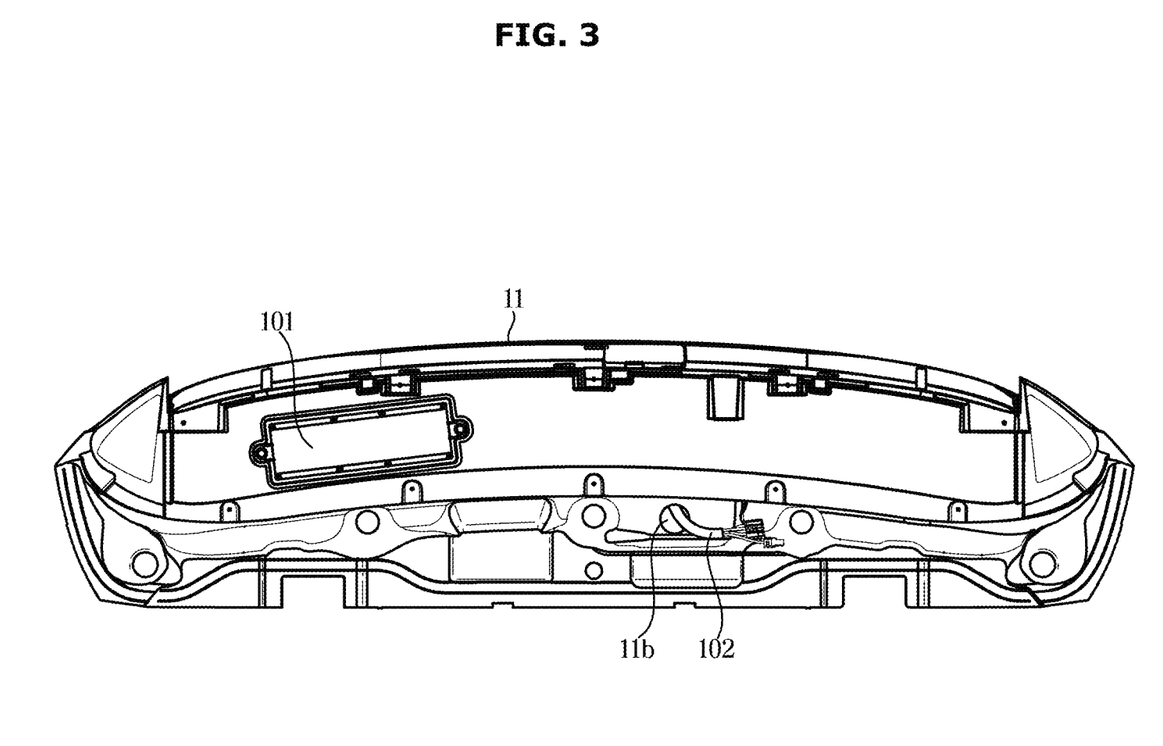
FIG. 3 illustrates an antenna apparatus according to an embodiment that is coupled to a spoiler.

FIG. 1 illustrates a vehicle according to an embodiment. FIG. 2 illustrates an antenna apparatus according to an embodiment that is separated from a spoiler. FIG. 3 illustrates an antenna apparatus according to an embodiment that is coupled to a spoiler. The vehicle includes a body that forms an exterior of the vehicle 1 and accommodates the driver and/or luggage, a chassis that includes components of the vehicle 1 except for the body, and electronic components that provide convenience to a driver. The body may form an interior space in which a driver may sit and ride, an engine compartment that accommodates an engine, and a trunk space that accommodates cargo. The chassis may include apparatuses that generate power so that the vehicle 1 may travel according to control of the driver, and drive/brake/steer the vehicle 1 by controlling and using the power. The electrical components may provide control of the vehicle 1 and safety and convenience for the driver and passengers.

Referring to FIG. 1, a roof panel 2 that forms a cabin of the vehicle 1 and corresponds to the ceiling of the cabin and a tail gate 3 that opens or closes a loading space at the rear of the vehicle 1 are provided in the vehicle 1.

At or near the rear of the vehicle 1, a spoiler 10 may be provided. The spoiler 10 may prevent or reduce vortex of air generated at the rear of the vehicle 1. The vortex at the rear of the vehicle 1 increases as the air flow becomes constant. The spoiler 10 may prevent or reduce vortex by making the air flow irregular.

The spoiler 10 may be installed, for example, on an upper end of the tail gate 3 of the vehicle 1 or on a trunk door (not shown).

The spoiler 10 of the vehicle 1 extends from the rear of the vehicle 1 toward the open space, i.e., the environment outside the vehicle.

An arrangement and shape of the spoiler 10 is advantageous for receiving radio waves from the open space and transmitting radio waves to the open space.

Using the arrangement and shape of the spoiler 10, as shown in FIG. 2, the spoiler 10 is provided with an antenna apparatus 100 that receives radio waves from the open space and transmits radio waves to the open space. For example, the spoiler 10 may be provided with a hollow portion for weight reduction and the antenna apparatus 100 may be disposed in the hollow of the spoiler 10.

The spoiler 10 includes a spoiler body 11 and a lower cover 12. The spoiler body 11 prevents or reduces vortex at the rear of the vehicle 1. For example, the spoiler body 11 may have a streamlined dome shape extending from the vehicle body of the vehicle 1 to the outside or open space.

The spoiler body 11 is formed with a seating portion 11a under the spoiler body 11 where the antenna apparatus 100 is seated. The seating portion 11a may be configured as a groove into which the antenna apparatus 100 may be inserted, for example, and may have a shape similar to that of the antenna apparatus 100.

The lower cover 12 may be coupled to a lower portion of the spoiler body 11 on which the antenna apparatus 100 is seated.

The lower cover 12 may cover the lower portion of the spoiler body 11 so that the antenna apparatus 100 mounted on the lower portion of the spoiler body 11 is not exposed to the outside.

The antenna apparatus 100 includes an active element, a patch antenna, and a pole type antenna, and may receive radio signals such as radio signals, broadcast signals, and satellite signals, and may transmit and receive signals to and from other vehicles, servers, and base stations.

The antenna apparatus 100 includes a casing 101 and a cable 102. The casing 101 forms an exterior of the antenna apparatus 100 and may accommodate main components of the antenna apparatus 100, for example, an antenna, a substrate, a semiconductor element, and the like.

The casing 101 is formed with a hole through which a coupling member such as a bolt may be inserted. The spoiler body 11 is provided with a nut into which a bolt penetrating the hole of the antenna apparatus 100 may be inserted.

The nut may be coupled to the spoiler body 11 by an insert method during injection molding of the spoiler body 11 so as not to be separated or rotated in response to the bolt being fastened.

The cable 102 extends outward from the casing 101, and may electrically connect the antenna apparatus 100 to the electric devices of the vehicle 1 (for example, communication devices, navigation devices, head units, etc.).

With the antenna apparatus 100 being seated on the seating portion 11a of the spoiler body 11, the cable 102 may be inserted into the spoiler body 11.

A connection hole 11 b is formed at one side of the spoiler body 11 so that the cable 102 may be connected to the vehicle 1.

One end of the cable 102 is exposed from the inside of the spoiler body 11 to the outside through the connection hole 11b. The one end of the cable 102 exposed to the outside may be connected to the vehicle 1.

Figure 4:
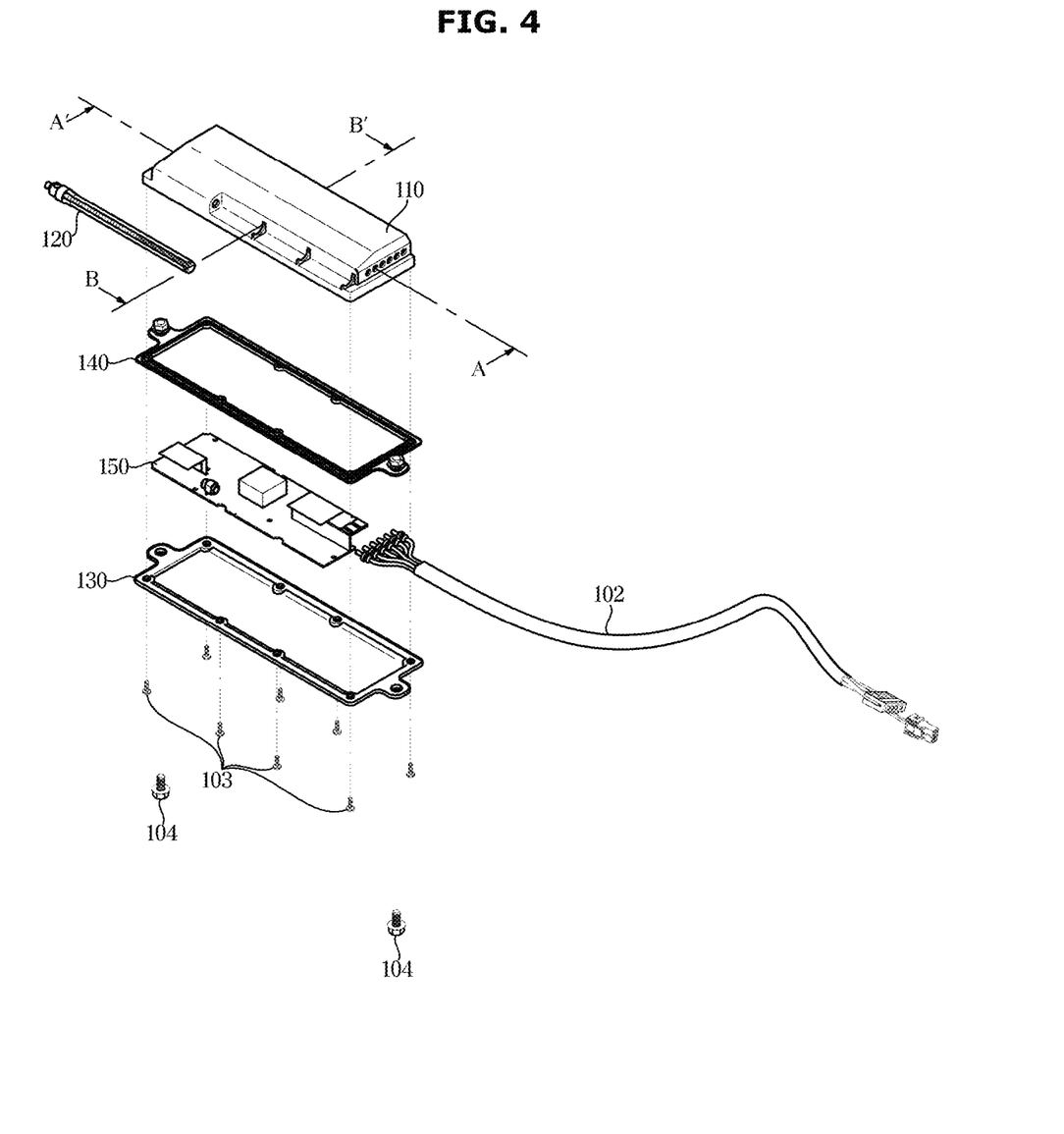
FIG. 4 is an exploded view of an antenna apparatus according to an embodiment.
Figure 5:
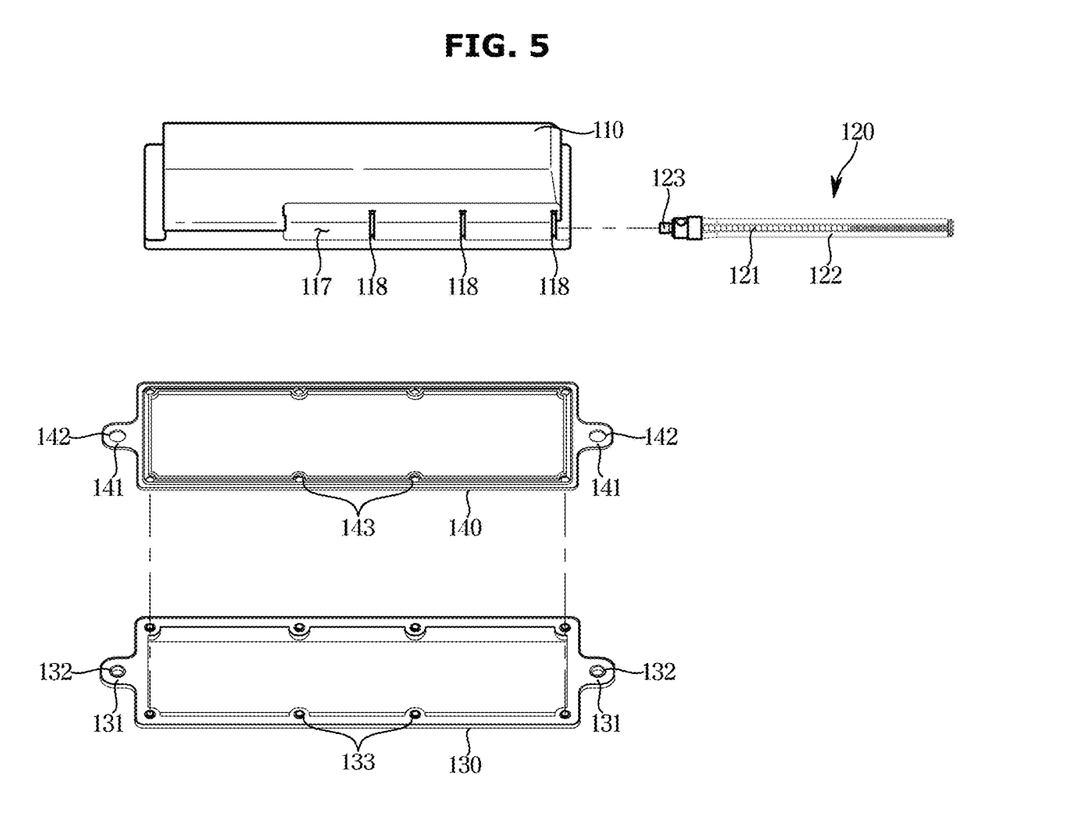
FIG. 5 is an exploded view of a casing of an antenna apparatus according to an embodiment.
Figure 6:
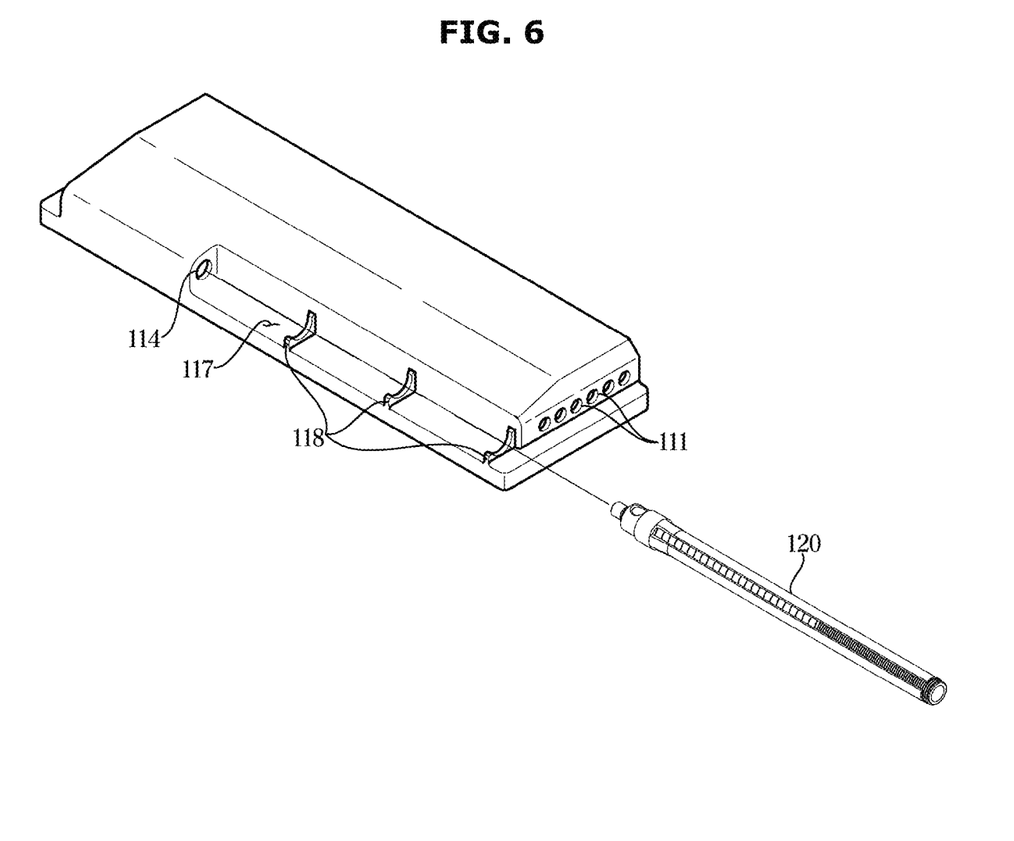
FIG. 6 illustrates an upper case and a pole type antenna of an antenna apparatus according to an embodiment.
Figure 7:
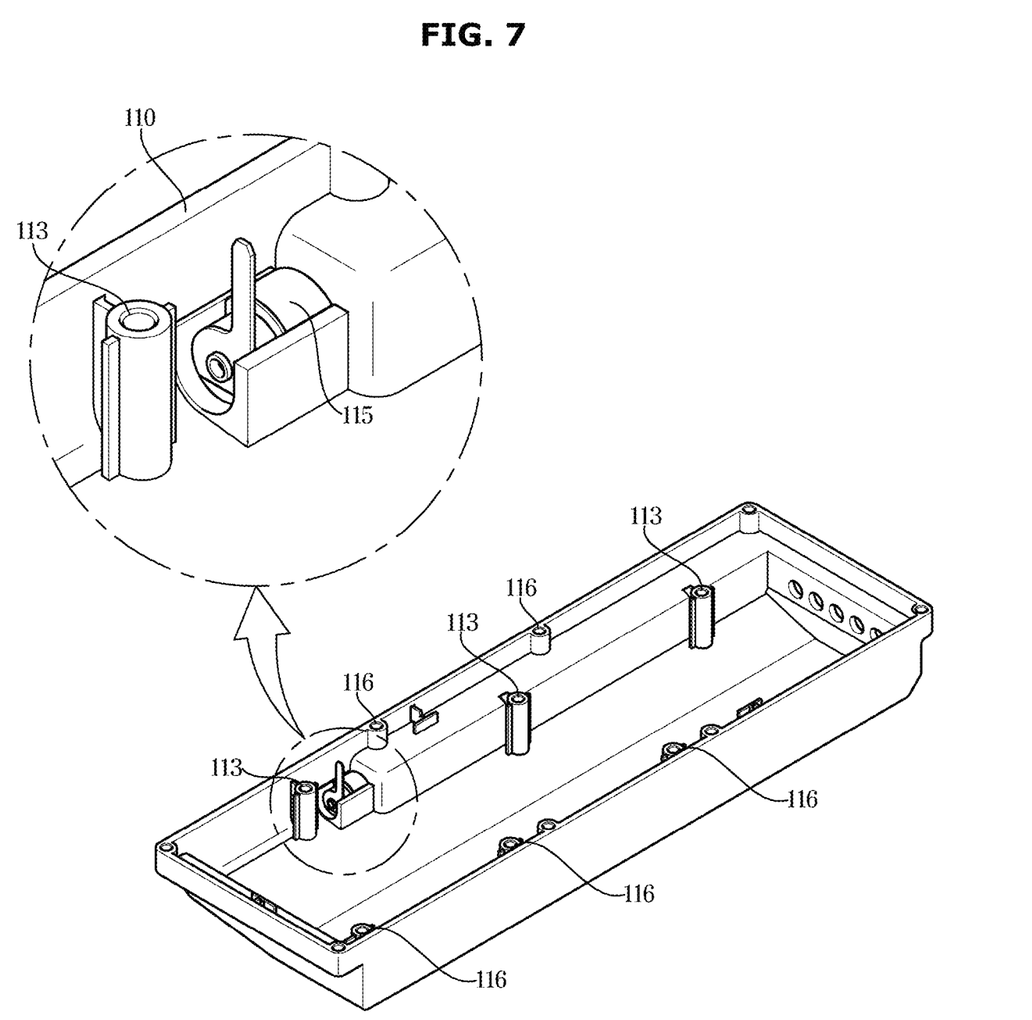
FIG. 7 illustrates a combination of a case and a pole type antenna of an antenna apparatus according to an embodiment.
Figure 8:
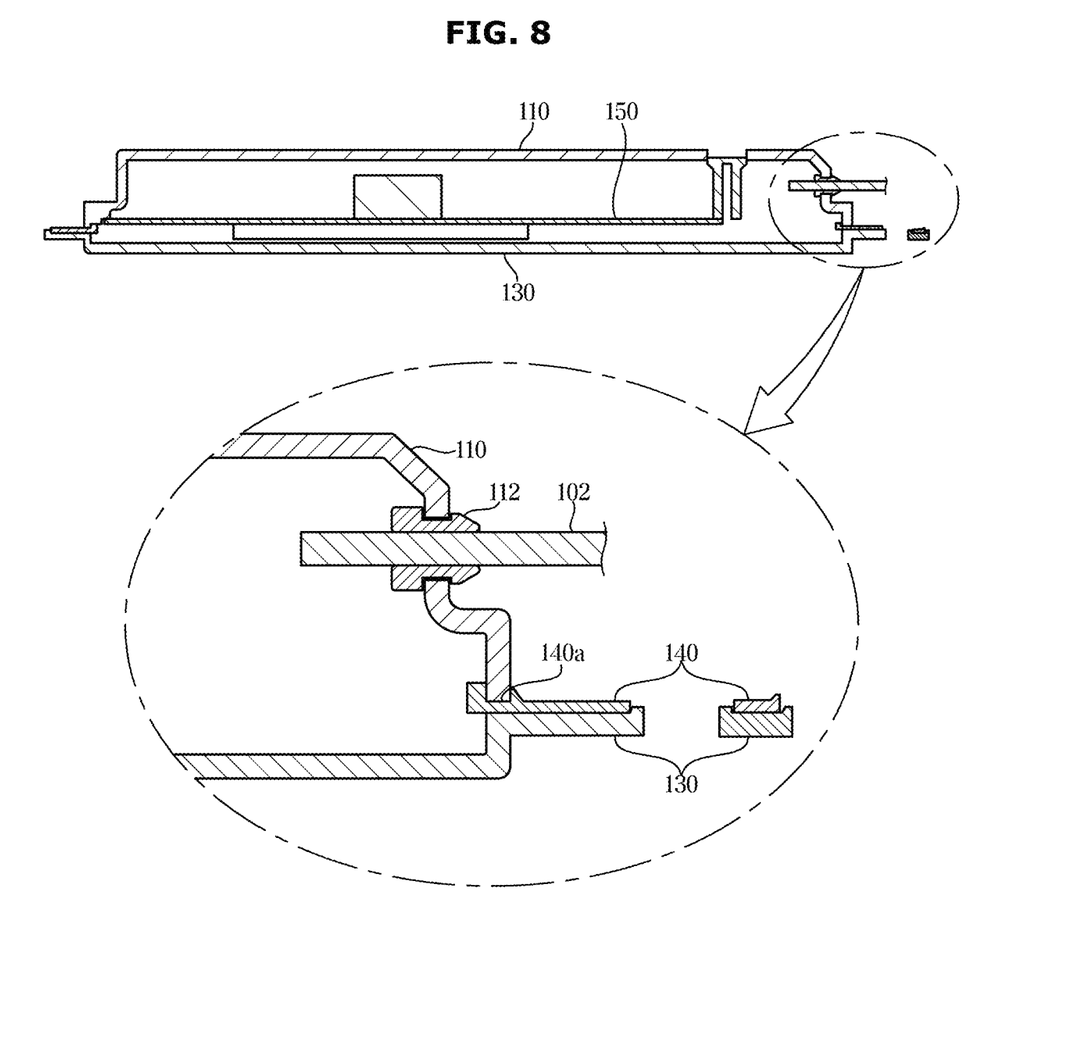
FIG. 8 illustrates a cross section along line A-A' shown in FIG. 4.
Figure 9:
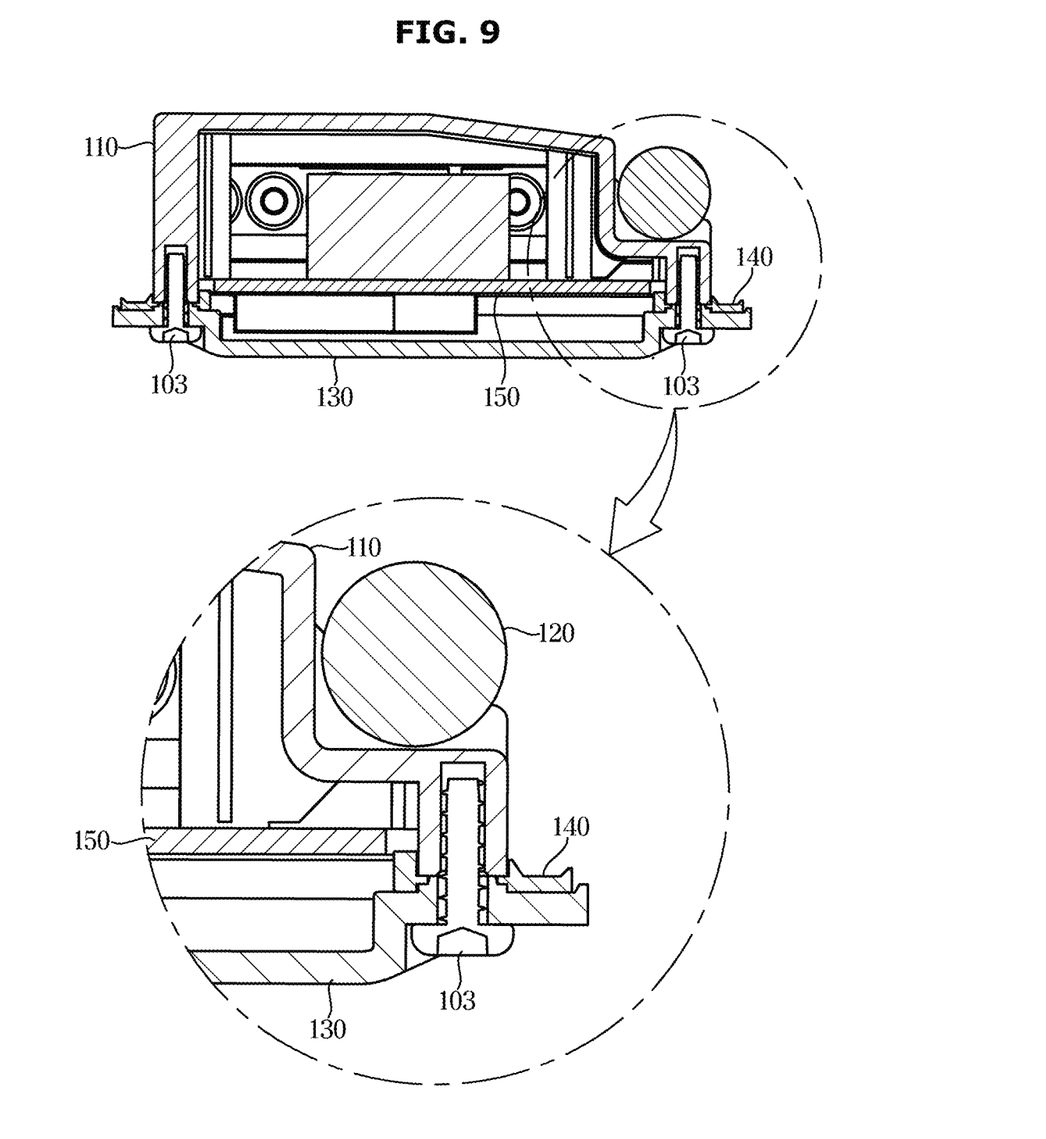
FIG. 9 illustrates a cross section along the line B-B' shown in FIG. 4.
Figure 10A:
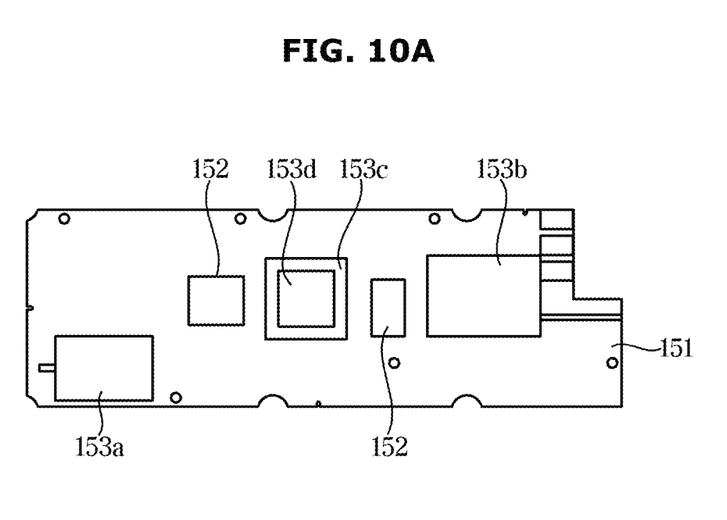
FIGS. 10A and 10B illustrate both sides of an antenna assembly included in an antenna apparatus according to an embodiment.
Figure 10B:
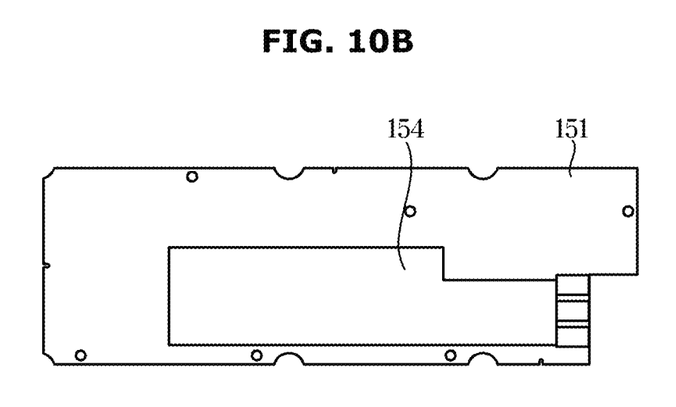

FIG. 4 is an exploded view of an antenna apparatus according to an embodiment. FIG. 5 is an exploded view of a casing of an antenna apparatus according to an embodiment. FIG. 6 illustrates an upper case and a pole type antenna of an antenna apparatus according to an embodiment. FIG. 7 illustrates a combination of a case and a pole type antenna of an antenna apparatus according to an embodiment. FIG. 8 illustrates a cross section along line A-A' shown in FIG. 4. FIG. 9 illustrates a cross section along the line B-B' shown in FIG. 4. FIGS. 10A and 10B illustrate both sides of an antenna assembly included in an antenna apparatus according to an embodiment.

Referring to FIGS. 4-10B the antenna apparatus 100 includes an upper case 110, a pole type antenna 120, a lower case 130, a sealing pad 140, an antenna assembly 150, and a cable 102.

The upper case 110 is formed of a plastic polymer compound for radiation of electromagnetic waves and may be coupled to the lower case 130 with the sealing pad 140 interposed therebetween. The upper case 110 may form the casing 101 of the antenna apparatus 100 together with the lower case 130.

The upper case 110 may protect structures and circuits included in the antenna apparatus 100 together with the lower case 130 from external impacts and environmental factors.

A side of the upper case 110 is formed with a cable through hole 111 that connects the cable 102 provided outside the casing 101 with the antenna assembly 150 provided inside the casing 101. The cable through hole 111 includes a plurality of holes penetrating the side of the upper case 110.

The cable 102 may pass through the upper case 110 through the cable through hole 111 as shown in FIG. 6. A cable sealing or seal element 112 is provided between the cable 102 and the upper case 110. The cable sealing 112 is press-fitted around outer shell of the cable 102, and may prevent foreign substances such as moisture from flowing into the casing 101 through the cable through hole 111.

The cable sealing 112 may be composed of a material having high elasticity for press-fitting into the cable 102 and compression for assembly into the upper case 110. For example, the cable sealing 112 may be a soft plastic rubber such as ethylene propylene rubber (EPDM) or thermoplastic elastomer (TPE) or thermoplastic polyurethane (TPU) or silicone.

A plurality of bosses 113 for fixing the antenna assembly 150 to the upper case 110 are provided inside the upper case 110 as shown in FIG. 7. The antenna assembly 150 is disposed on the plurality of bosses 113 and may be fixed to the upper case 110 by screwing.

The side of the upper case 110 is formed with an antenna through hole 114 that connects the pole type antenna 120 provided outside the casing 101 with the antenna assembly 150 provided inside the casing 101.

The inside of the upper case 110 is provided with a pole insert 115 made of a metal material electrically connected to the antenna assembly 150 as shown in FIG. 7. The pole insert 115 may be inserted and assembled in response to the upper case 110 made of a plastic polymer material being molded.

The edge of the upper case 110 is formed with an assembly hole 116 into which an assembly screw 103 is inserted for assembling the upper case 110, the sealing pad 140, and the lower case 130.

In addition, one side of the upper case 110 is formed with a seating space 117 accommodating the pole-type antenna 120 so that the pole-type antenna 120 protrudes outward from the outermost portion of the casing 101, which may be box-shaped in appearance, in response to the pole-type antenna 120 being coupled to the upper case 110. Further, the seating space 117 is provided with a plurality of supports 118 for supporting the pole type antenna 120.

The pole type antenna 120 may be screwed to the pole insert 115 through the antenna through hole 114. The pole type antenna 120 may be electrically connected to the antenna assembly 150 through a pole insert 115 made of a metal material.

The pole type antenna 120 may receive an AM/FM radio broadcast signal, a Digital Multimedia Broadcasting (DMB) signal, and a Digital Audio Broadcasting (DAB) signal from the environment or an open space.

The pole type antenna 120 includes an outer shell 122 that prevents the movement of a metal spring coil 121. The outer shell 122 may be made of polycarbonate (PC) or polyoxymethylene (POM) and the spring coil 121 may be inserted in response to the outer shell 122 being formed.

At one end of the pole-type antenna 120, a metal thread 123 is formed.

The metal thread 123 is provided to rotate and fasten the pole type antenna 120 to the pole insert 115 made of a metal material provided in the upper case 110. The metal thread 123 is electrically connected to the spring coil 121, and the spring coil 121 may be electrically connected to the antenna assembly 150 through a combination of the metal thread 123 and the pole insert 115 made of a metal material.

The lower case 130 may be combined with the upper case 110 to form the casing 101 of the antenna apparatus 100.

The sealing pad 140 is provided between the lower case 130 and the upper case 110 so that the upper case 110 may be guided so that the upper case 110 is positioned at a predetermined position in response to assembling the upper case 110 to the lower case 130.

At both ends of the lower case 130, a planar projection 131 in the form of wings for fixing the antenna apparatus 100 to the spoiler 10 are provided. A fixing hole 132 is formed in the planar protrusion 131 into which a spoiler fixing bolt 104 for fixing the antenna apparatus 100 to the spoiler 10 is inserted.

The edge of the lower case 130, is formed with an assembly hole 133 into which an assembly screw 103 is inserted for assembling the upper case 110, the sealing pad 140, and the lower case 130.

The sealing pad 140 is provided between the upper case 110 and the lower case 130 and may be seated in the coupling portion between the upper case 110 and the lower case 130 and may form a seal when compressed in response to the upper case 110 and the lower case 130 being coupled.

A space is formed in the center of the sealing pad 140 so that the antenna assembly 150 can be positioned thereat. In other words, the sealing pad 140 may have a rectangular ring shape.

In order to improve water inflow prevention, a coupling groove 140a is formed in the sealing pad 140. Specifically, the coupling groove 140a is formed along a portion approximately in the center of the sealing pad 140, whereby the cross-section of the sealing pad 140 may have an approximately "U" shape as shown in FIG. 8.

The upper case 110 is inserted into the coupling groove 140a of the sealing pad 140, and thereby, preventing the upper case 110 from being separated in response to the upper case 110 being coupled to the lower case 130 and the sealing pad 140.

At both ends of the sealing pad 140, a planar projection 141 in the form of wings for fixing the antenna apparatus 100 to the spoiler 10 are provided. A fixing hole 142 is formed in the planar protrusion 141 into which a spoiler fixing bolt 104 for fixing the antenna apparatus 100 to the spoiler 10 is inserted.

The sealing pad 140 is formed with an assembly hole 143 into which an assembly screw 103 is inserted for assembling the upper case 110, the sealing pad 140, and the lower case 130.

The sealing pad 140 may be made of a soft rubber such as ethylene propylene rubber (EPDM) or a thermoplastic elastomer (TPE). The antenna assembly 150 includes a printed circuit board 151, a plurality of printed circuit boards 152, and a plurality of patch antennas 153.

The plurality of printed circuit boards 152 and the plurality of patch antennas 153 are mounted on upper portion of the printed circuit board 151. A metal pattern for connecting the plurality of patch antennas 153 to the plurality of printed circuit boards 152 is formed on upper portion of the printed circuit board.

The plurality of printed circuit boards 152 may process electrical signals received by the plurality of patch antennas 153. For example, the plurality of printed circuit boards 152 may include a low noise amplifier (LNA).

The plurality of patch antennas 153 may receive an electromagnetic field from a free space and provide electrical signals corresponding to the electromagnetic field to the plurality of printed circuit boards 152.

The plurality of patch antennas 153 include, for example, mobile communication antennas 153a and 153b, a global navigation satellite system (GNSS) antenna 153c, and a SXM (SiriusXM) antenna 153d.

The mobile communication antennas 153a and 153b include a first mobile communication antenna 153a and a second mobile communication antenna 153b to provide spatial diversity. Here, the diversity refers to a communication method that improves communication performance by using a plurality of signals transmitted through a plurality of different independent paths in order to prevent a reception performance degradation due to fading. In particular, spatial diversity refers to a communication method that improves communication performance by using a plurality of signals received through a plurality of antennas sufficiently spaced apart.

Referring to FIG. 10A, the first mobile communication antenna 153a is provided at one end of the printed circuit board 151 and the second mobile communication antenna 153b is provided at another end of the printed circuit board 151. Accordingly, the first mobile communication antenna 153a may be spaced apart from the second mobile communication antenna 153b by a maximum distance within the casing 101.

Accordingly, the first mobile communication antenna 153a and the second mobile communication antenna 153b may provide spatial diversity.

The GNSS antenna 153C may be stacked with the SXM antenna 153D. For example, as shown in FIG. 10A, the GNSS antenna 153C may be mounted on the printed circuit board 151, and the SXM antenna 153D may be disposed on the GNSS antenna 153C.

A shield can 154 for shielding noise from an active circuit such as an LNA is provided on lower portion of the printed circuit board 151, as shown in FIG. 10B.

As described above, the antenna apparatus 100 includes the pole-type antenna 120 provided outside the casing 101, the mobile communication antennas 153a and 153b provided inside the casing 101, the GNSS antenna 153C, and SXM antenna 153D. In addition, the antenna apparatus 100 may further include a printed circuit board 152 for processing signals received by the antenna as well as the antenna, whereby the connection wiring between the antenna apparatus 100 and the head unit of the vehicle 1 can be reduced.

Figure 11:
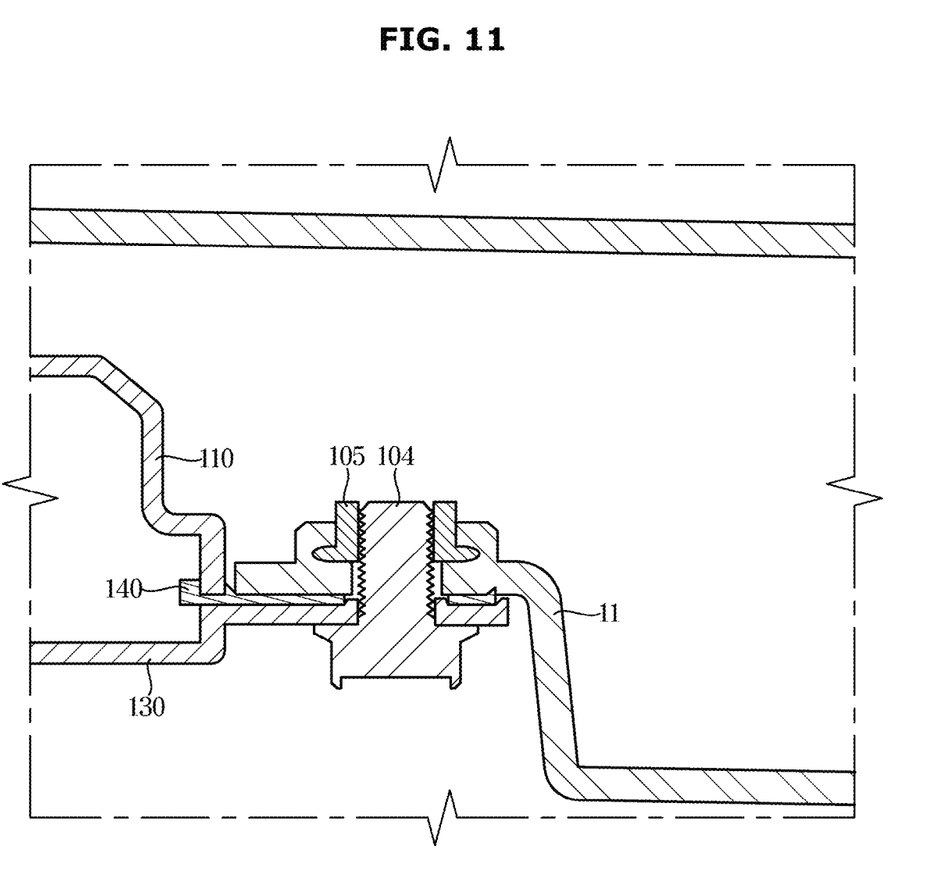
FIG. 11 illustrates an example of a coupling member for coupling an antenna apparatus to a spoiler according to an embodiment.

The antenna apparatus 100 is fixed to the spoiler 10 of the vehicle 1 as described above. First, the antenna apparatus 100 is seated on the seating portion 11a. For example, the antenna apparatus 100 may be inserted into the mounting portion 11a such that the upper portion of the antenna apparatus 100 faces the mounting portion 11a. Thereafter, the antenna apparatus 100 is fixed to the spoiler body 11. FIG. 11 illustrates an example of a coupling member for coupling an antenna apparatus to a spoiler according to an embodiment.

For example, the antenna apparatus 100 may be fixed to the spoiler body 11 by a fixing nut 105 and a fixing bolt 104 inserted into the spoiler body 11 by an insert method as shown in FIG. 11.

The fixing bolt 104 may pass through the planar protrusion 131 of the lower case 130 and the planar protrusion 141 of the sealing pad 140 to be coupled with the fixing nut 105.

In this case, the planar protrusion 141 of the sealing pad 140 is disposed between the spoiler 10 and the planar protrusion 131 of the lower case 130. As a result, the sealing pad 140 may alleviate vibrations that occur while the vehicle 1 is traveling.

Thereafter, the lower cover 12 may be assembled to the spoiler body 11 and the spoiler 10 may be assembled to the vehicle 1.

In the above, it has been described that the antenna apparatus 100 is coupled to the lower portion of the spoiler 10, but is not limited thereto.

Figure 12:
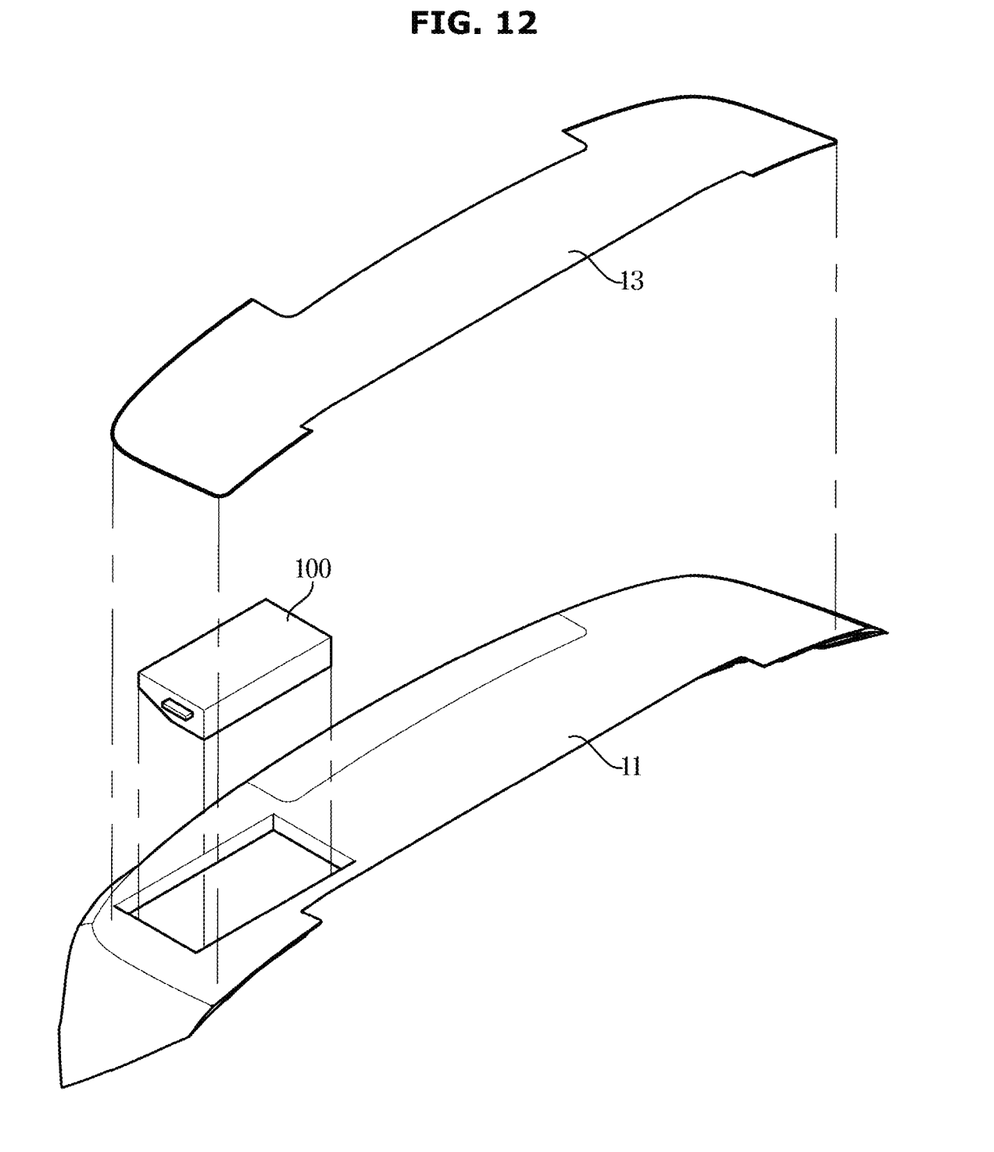
FIG. 12 illustrates another example of an arrangement of an antenna apparatus according to an embodiment.

FIG. 12 illustrates another example of an arrangement of an antenna apparatus according to an embodiment.

As shown in FIG. 12, the spoiler 10 includes a spoiler body 11 and an upper cover 13.

A seating portion 11a is formed on the spoiler body 11 so that the antenna apparatus 100 is seated, and the antenna apparatus 100 may be inserted into the seating portion 11a.

The upper cover 13 may be coupled to an upper portion of the spoiler body 11 on which the antenna apparatus 100 is seated. The upper cover 13 may cover the lower portion of the spoiler body 11 so that the antenna apparatus 100 mounted on the lower portion of the spoiler body 11 is not exposed to the outside.

An aspect of the disclosure is to provide a spoiler for a vehicle in which an antenna of the vehicle is embedded and a vehicle including an antenna embedded in the spoiler. An aspect of the disclosure is to provide a spoiler in which a plurality of antennas operating at different frequencies are embedded and a vehicle including the same.

An aspect of the disclosure is to provide a spoiler in which an antenna apparatus capable of mounting a plurality of antennas for mobile communication is embedded, and a vehicle including the same.

Although several embodiments of the present disclosure have been described for illustrative purposes, those having ordinary skill in the art should appreciate that various modifications, additions and substitutions are possible, without departing from the scope and spirit of the disclosure. Therefore, the embodiments of the present disclosure have not been described for limiting purposes.

What is claimed is:

1. A vehicle, comprising:
   a spoiler mounted on or near a rear of the vehicle; and
   an antenna apparatus provided inside the spoiler, wherein the spoiler includes a spoiler body configured to include a seating portion on which the antenna apparatus is seated and includes a cover configured to cover the seating portion,
wherein the antenna apparatus includes
   a casing,
   a cable electrically connected to an electric apparatus in the vehicle,
   a pole type antenna provided outside the casing, and
   an antenna assembly electrically connected to the cable and the pole type antenna, where the antenna assembly includes at least one semiconductor element and a plurality of patch antennas mounted on a printed circuit board.

2. The vehicle of claim 1, wherein the casing comprises:
   an upper case;
   a lower case; and
   a sealing pad disposed between the upper case and the lower case.

3. The vehicle of claim 2, wherein the upper case is provided with a seating space in which the pole type antenna is seated.

4. The vehicle of claim 3, wherein the seating space is provided with a plurality of supports configured to support the pole type antenna.

5. The vehicle of claim 2, wherein the pole type antenna comprises:
   a spring coil;
   a shell surrounding the spring coil; and
   a metal thread electrically connected to the spring coil and inserted into the upper case.

6. The vehicle of claim 5, wherein the upper case includes a pole insert coupled to the metal thread, and wherein the pole insert is electrically connected to the antenna assembly.

7. The vehicle of claim 2, wherein the sealing pad is provided with a coupling groove into which the upper case is inserted.

8. The vehicle of claim 2, wherein each of the lower case and the sealing pad is provided with a fixing hole into which a bolt is inserted for fixing the antenna apparatus to the spoiler body.

9. The vehicle of claim 1, wherein the plurality of patch antennas includes a first mobile communication antenna installed on one end of the printed circuit board and a second mobile communication antenna installed on another end of the printed circuit board.

10. The vehicle of claim 1, wherein the plurality of patch antennas includes a global navigation satellite system (GNSS) antenna and a SiriusXM (SXM) antenna stacked on the GNSS antenna.

* * * * *